US012810000B2

(12) United States Patent
Gupta et al.

(10) Patent No.: US 12,810,000 B2
(45) Date of Patent: Nov. 24, 2026

(54) DEVICE TRUST SYSTEM FOR MANAGING A LARGE NUMBER OF IoT DEVICES IN A DISTRIBUTED ENVIRONMENT

(71) Applicant: DigiCert, Inc., Lehi, UT (US)

(72) Inventors: Atul Gupta, Cupertino, CA (US); Ruslan Ulanov, Haslet, TX (US); Mahendra Shelke, Santa Clara, CA (US); Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 90 days.

(21) Appl. No.: 18/897,053

(22) Filed: Sep. 26, 2024

(65) Prior Publication Data

US 2026/0087158 A1 Mar. 26, 2026

(51) Int. Cl.
*G06F 21/60* (2013.01)

(52) U.S. Cl.
CPC .................................. *G06F 21/606* (2013.01)

(58) Field of Classification Search
CPC .................................................... G06F 21/606
See application file for complete search history.

(56) References Cited

U.S. PATENT DOCUMENTS

| | | | | |
|---|---|---|---|---|
| 11,595,217 | B2 | 2/2023 | Kumar et al. | |
| 11,818,108 | B2 | 11/2023 | Kumar et al. | |
| 12,008,110 | B2 | 6/2024 | Kumar et al. | |
| 2013/0016695 | A1* | 1/2013 | Ravindran | H04L 67/63 370/331 |
| 2019/0166227 | A1* | 5/2019 | Becker | G06F 8/60 |
| 2020/0067915 | A1 | 2/2020 | Kumar et al. | |
| 2020/0169549 | A1* | 5/2020 | Smith | H04L 63/101 |
| 2021/0126726 | A1* | 4/2021 | Parkvall | H04W 4/00 |
| 2021/0266326 | A1* | 8/2021 | Chen | H04L 67/52 |
| 2022/0400118 | A1* | 12/2022 | Jiang | G06F 21/45 |
| 2023/0123781 | A1* | 4/2023 | Kaimal | H04L 43/50 726/12 |
| 2023/0208652 | A1 | 6/2023 | Kumar et al. | |
| 2023/0300129 | A1 | 9/2023 | Hojjati et al. | |
| 2023/0344639 | A1 | 10/2023 | Hojjati | |
| 2023/0344650 | A1 | 10/2023 | Hojjati | |

(Continued)

OTHER PUBLICATIONS

Shang et al. Breaking out of the Cloud: Local Trust Management and Rendezvous in the Named Data Networking of Things. In proc. of IEEE Int. conference on IoTDI (Year: 2017).*

*Primary Examiner* — Lynn D Feild
*Assistant Examiner* — Vladimir I Gavrilenko
(74) *Attorney, Agent, or Firm* — Baratta Law PLLC; Lawrence A. Baratta, Jr.

(57) ABSTRACT

Trust systems and methods are provided in a distributed architecture. In one implementation, a distributed system includes multiple Internet of Things (IoT) devices distributed throughout a network, wherein each IoT device is embedded with a local agent configured to perform processing and/or computing functionality. The distributed system further includes a backend entity, such as a device trust system, configured to manage the multiple IoT devices. In addition, the distributed system includes multiple Rendezvous Zone (RZ) proxy devices communicatively interposed at edge locations in the network between the backend entity and the multiple IoT devices. Each RZ proxy device is configured to perform trust and security functionality on behalf of one or more IoT devices of the multiple IoT devices.

20 Claims, 6 Drawing Sheets

(56) References Cited

U.S. PATENT DOCUMENTS

| | | | |
|---|---|---|---|
| 2023/0385811 | A1 | 11/2023 | Naidoo et al. |
| 2024/0096051 | A1 | 3/2024 | Gopalakrishna et al. |
| 2024/0249029 | A1 | 7/2024 | Hojjati |
| 2025/0344166 | A1 * | 11/2025 | Garcia Morchon .......................... H04W 56/001 |
| 2026/0150030 | A1 * | 5/2026 | Wang .................... H04W 40/22 |
| 2026/0180949 | A1 * | 6/2026 | Zanouda ............... H04L 61/103 |

* cited by examiner

DEVICE TRUST SYSTEM FOR MANAGING A LARGE NUMBER OF IoT DEVICES IN A DISTRIBUTED ENVIRONMENT

FIELD OF THE DISCLOSURE

The present disclosure relates generally to networking. More particularly, the present disclosure relates to systems and methods for deploying and operating a distributed trust system having at least three layers to manage, secure, and identity a large number of Internet of Things (IoT) devices or embedded devices.

BACKGROUND

Internet of Things (IoT) devices (e.g., embedded devices, connected devices, etc.) are manufactured devices that may be built for one purpose (e.g., refrigerator for keeping food cool), but also include embedded processing functionality (e.g., microprocessors, memory, etc.) that allow the device to communicate over the Internet for communicating telemetry information to a centralized management device, download firmware updates, and for performing other functions. In typical systems with IoT device monitoring and management, it can be possible for a hacker to interfere with normal operations. News articles have reported hackers tapping into a baby monitor and peering into homes, software flaws in medical devices leaving these devices vulnerable to hackers and taking industrial control systems hostage. Therefore, improving security with respect to IoT devices and systems in which IoT devices may be monitored is critical for the safety and security of users. Specifically, users want to know for sure whether or not their devices can be trusted to perform essential functions, such as regulating the flow of medicine or insulin into their bodies, properly locking or unlocking doors to their houses, properly controlling heating and air conditioning systems in an office or home, etc. Improving the security of IoT device monitoring and management systems is necessary to reduce financial damage, data loss, regulatory violations, customer distrust, etc. Such systems should prevent theft of private user data, unauthorized system access, end user exploitation, etc. Also, such systems should prevent counterfeit devices, data privacy violations, data integrity compromises, device or system hostage situations, unauthorized system access, infrastructure disruption, etc.

BRIEF SUMMARY

The present disclosure relates to systems and methods for deploying a distributed trust system on multiple layers for managing a plurality (e.g., a large number such as millions) of Internet of Things (IoT) devices, embedded devices, or connected devices. In various embodiments, the present disclosure includes a) methods having steps, b) processing devices configured to implement the steps, c) cloud services configured to implement the steps, and d) non-transitory computer-readable media storing instructions for programming one or more processors to execute the steps.

In one implementation, a distributed system may include multiple IoT devices distributed throughout a network (i.e., a combination of the Internet, Wide Area Networks (WANs), Local Area Networks (LANs), service provider networks, and the like), each IoT device embedded with a local agent configured to perform processing and/or computing functionality. The distributed system also includes a backend entity configured to manage the multiple IoT devices. Furthermore, the distributed system includes multiple Rendezvous Zone (RZ) proxy devices communicatively interposed at edge locations in the network between the backend entity and the multiple IoT devices. Each RZ proxy device is configured to perform trust and security functionality on behalf of one or more IoT devices of the multiple IoT devices.

In some embodiments, the multiple IoT devices may include millions of IoT devices distributed across the globe, wherein the backend entity may be configured as a Certificate Authority (CA) and/or Software as a Service (SaaS) system for securely managing the millions of IoT devices. The distributed system may further include a cluster control device arranged on an RZ layer with the multiple RZ proxy devices for controlling how the IoT devices are clustered with respect to corresponding RZ proxy devices.

In some embodiments, a device trust manager may be configured at a backend of a trust system having at least three deployment layers. The device trust manager, for example, may include a processing device and memory configured to store a device trust program having computing logic, where the computing logic enables the processing device to perform certain steps. For example, the processing device may be programmed to manage multiple IoT devices distributed at a low layer of the trust system, where each IoT device has a local agent embedded therein. Also, the processing device may be programmed to communicate with multiple Rendezvous Zone (RZ) proxy devices interposed at edge locations between the device trust manager and the multiple IoT devices. The computing logic may further enable the processing device to conduct trust and security functions for the multiple IoT devices via the multiple RZ proxy devices and local agents, whereby each RZ proxy device may operate on behalf of one or more IoT devices of the multiple IoT devices.

According to another implementation, an intermediate proxy device may be arranged along with one or more other intermediate proxy devices at a Rendezvous Zone (RZ) of a trust system having at least three deployment layers. The intermediate proxy device, for example, may include a processing device and memory. The memory may be configured to store a device trust program having computing logic that enables the processing device to perform steps. One step may include communicating with a device trust manager configured as a backend system and arranged at a top layer of the trust system, wherein the device trust manager is configured to manage multiple Internet of Things (IoT) devices distributed at a bottom layer of the trust system. Another step may include conducting trust and security functions for a corresponding cluster of IoT devices of the multiple IoT devices via local agents embedded in the cluster of IoT devices to thereby operate on behalf of the cluster of IoT devices.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

The present disclosure is directed to systems and methods for providing digital trust in a communication network. With respect to device trust, the present disclosure provides a three-layered distributed system that may be deployed throughout a network, i.e., the Internet and other networks. The distributed trust system may be configured, for example, to manage multiple Internet of Things (IoT) devices, embedded devices, or connected devices, even millions or tens of millions of IoT-type devices.

According to some embodiments, the present disclosure may include distributed systems that may include multiple IoT devices distributed throughout a network. Each IoT device, for example, may be embedded with a local agent that is configured to perform processing and/or computing functionality for the respectively IoT device. However, some of the functionality of the agents embedded in conventional IoT devices may be transferred or offloaded to an intermediate proxy device that is configured to operate on behalf of a group of IoT devices and work as a middleman between the millions of IoT devices and a single centralized management system. The intermediate proxy devices may be arranged in a Rendezvous Zone (RZ) at edge locations of the network and interposed between the backend entity and the multiple IoT devices. Each RZ proxy device may be configured to perform trust and security functionality on behalf of one or more IoT devices of the multiple IoT devices.

Therefore, the intermediate proxy devices can regulate the communication flow between the top and bottom layers of the distributed system and assist the management system at the top layer (e.g., backend device) with certification, security, software/firmware updates, etc. The backend entity of the distributed system may then be configured to manage the multiple IoT devices in a more efficient and effective manner.

Three-layer Trust System

Figure 1:
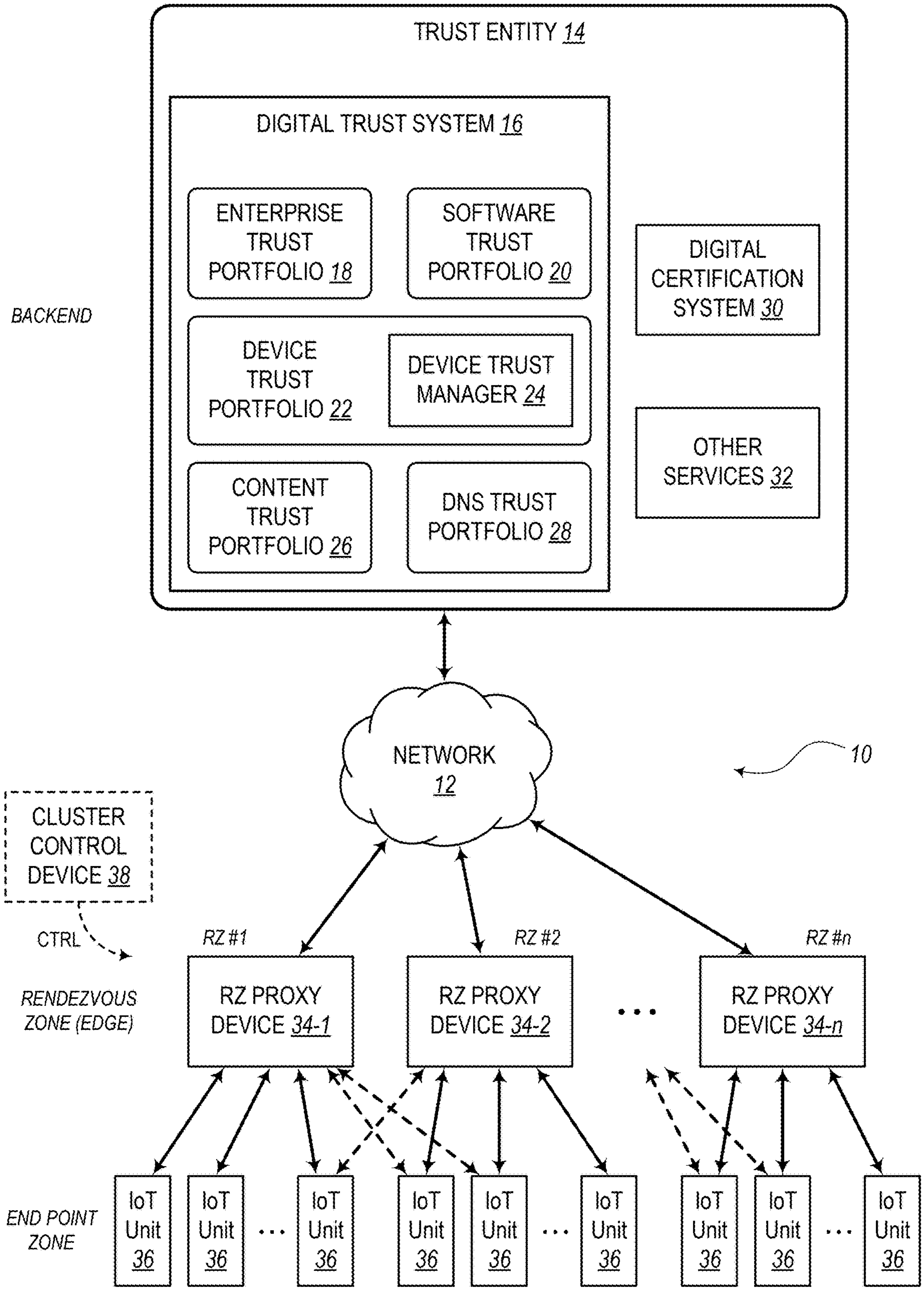
FIG. 1 is a diagram illustrating a three-layer trust system, according to various embodiments of the present disclosure.

FIG. 1 is a diagram illustrating an embodiment of a three-layer trust system 10 configured to operate over a network 12, such as the Internet, WANs, LANs, and a combination thereof. The three-layer trust system 10 includes a top layer acting as a backend, a middle layer referred to herein as a Rendezvous Zone (RZ), and a low layer or “end point zone” where end user devices and Internet of Things (IoT) devices may be utilized.

The backend (i.e., top layer of the three-layer trust system 10) includes a trust entity 14 configured to perform various trust services, such as device certification, cyber security, etc. In one example, the trust entity 14 may be configured as or extend the functionality of a digital certificate management platform. In some embodiments, the trust entity 14 may include a digital trust system 16, including at least an enterprise trust portfolio 18, a software trust portfolio 20, a device trust portfolio 22 (which includes at least a device trust manager 24), a content trust portfolio 26, and a Domain Name System (DNS) trust portfolio 28.

In some embodiments, the enterprise trust portfolio 18 may include public trust services, private trust services, Certificate Lifecycle Management (CLM) services, trust lifecycle management services, Public Key Infrastructure (PKI) services, etc. The software trust portfolio 20 may include software trust management services. In addition to the device trust manager 24, the device trust portfolio 22 may also include an IoT trust management service, trust core Software Development Kit (SDK), etc. In some embodiments, the content trust portfolio 26 may include a document trust management service. Also, the DNS trust portfolio 28 may include DNS management services, performance monitoring services, etc.

Also, according to some embodiments, the trust entity 14 may further include a digital certification system 30 or other similar services to enable the trust entity 14 to act as a Certificate Authority (CA). The trust entity 14 may also include other services 32 and/or other related security and trust systems. For example, the trust entity 14 may be configured to provide account services for managing roles, groups, users, and policies. The trust entity 14 can also include validation services, such as organization validity, domain validity, individual identity, etc. Furthermore, the trust entity 14 may be configured to provide certificate and registration authority services, such as the issuance of digital certificates. In some cases, the trust entity 14 can also provide platform services (e.g., Kubernetes, Docker, authentication, authorization, shared services, etc.).

Typically, a backend device may be configured to manage a number of IoT devices directly. However, the embodiments of the present disclosure are configured to use one or more intermediate layers between the backend (e.g., trust entity 14) and the IoT devices at the far reaches of the Internet. In particular, the embodiment shown in FIG. 1 includes the RZ, which includes a plurality of RZ proxy devices 34-1, 34-2, . . . , 34-*n* positioned at the edge of the three-layer trust system 10 within range of a plurality of IoT units 36 (e.g., IoT devices, embedded devices, connected devices, resource-constrained devices, etc.). An IoT unit 36 may be any suitable type of manufactured device (e.g., electronic device) having a specific purpose that might not necessarily be associated with network communications.

For example, the IoT units 36 may have a primary function as a refrigerator, freezer, oven, stove, kitchen range, microwave oven, dishwasher, coffee maker, espresso machine, toaster, toaster oven, air fryer, blender, mixer, food processor, juicer, slow cooker, pressure cooker, ice maker, washer, dryer, vacuum cleaner, barista machine, HVAC system, utility meter, smart door lock, security system, smoke detector, carbon monoxide detector, measuring and testing device, heartrate monitor, glucose monitor, temperature sensor, smart watch, smart ring, network equipment, network switch, router, modem, Wi-Fi access point, vending machine, sensor, camera, autonomous vehicle, medical equipment, personal medical device, medication administering device, or other electronic or manufactured device. In addition to this primary function, the IoT unit 36 may also be equipped with some type of computing, processing, digital storage, and/or connectivity functionality embedded therein for the purpose of allowing various services that may normally be provided to IoT devices.

In some embodiments, the three-layer trust system 10 may also include a cluster control device 38 configured to control the clustering of IoT units 36 into groups associated with each of the RZ proxy devices 34. The clustering may be conducted based on the proximity in location between each IoT unit 36 and each RZ proxy device 34. Also, clustering may be conducted based on a load balancing scheme used to balance the load on each RZ proxy device 34. Also, if one or more RZ proxy devices 34 are overloaded, faulty, etc. and/or are experiencing excessive latency, the cluster control device 38 may be configured to dynamically regroup the IoT units 36 with the available RZ proxy devices 34 as needed.

Device Trust Portfolio

Figure 2:
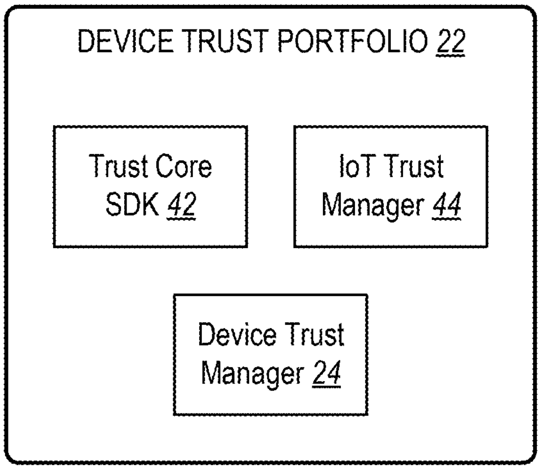
FIG. 2 is a block diagram illustrating the device trust portfolio shown in FIG. 1, according to various embodiments.

FIG. 2 is a block diagram illustrating an embodiment of the device trust portfolio 22 shown in FIG. 1. In this embodiment, the device trust portfolio 22 includes the device trust manager 24 and further includes a trust core SDK 42 (e.g., TrustCore) and IoT trust manager 44 and may further include other services, software, and functions. The device trust portfolio 22 may be simple to use, fully integrated, and offer end-to-end device security.

The trust core SDK 42 may be configured to enable full stack development for real-time embedded security, secure transport protocols, and application security. The trust core SDK 42 may include an IoT device developer kit and may offer key protection and management. Also, the trust core SDK 42 may include a 1) Trust Abstraction Platform that may be integrated with any secure element, 2) Crypto Abstraction Platform that may comply with export/import controls, 3) Secure Transport Protocol Stack that may be integrated with secure elements, etc. The trust core SDK 42 may include various protocols, such as Simple Certificate Enrollment Protocol (SCEM), Message Queuing Telemetry Transport (MQTT) protocol (e.g., MQTT 3.1.1/5.0 client), PQC/Dilithium, FIPS 140-2/3, OpenSSL 1.1, 3.0, etc. for various clients and connectors. Also, in some embodiments, the trust core SDK 42 may be Operating System (OS) and processor agnostic, may have a small memory footprint, and may include C source code.

The IoT Trust Manager 44 may be configured as CLM for the IoT units 36. The PKI management solution may include embedding and managing device identity at scale through the provisioning and lifecycle management of digital certificates. The IoT Trust Manager 44 may support various systems in private Certificate Authority (CA), public CA, and/or Enterprise JavaBeans Certificate Authority (EJBCA) environments. Also, the IoT trust manager 44 may support CSA Matter PAA and PAI, flexible workflows built for IoT, EST, ACME, SCEP, CMPv2, REST, batch certificate issuance, PQC/Dilithium, on-premises gateway, etc. and may be built on any suitable security platform with SaaS and on-premises offerings.

The Device Trust Manager 24 may be built on an IoT Product Security Platform that simplifies device registration, provisioning, updates, and security monitoring. Also, the device trust manager 24 may ensure deployments and management at scale. Also, the device trust manager 24 may support single, bulk, and/or Just In Time (JIT) device registration, MQTT for secure communications and device updates, device software vulnerability scanning, and SBOM monitoring for Common Vulnerabilities and Exposures (CVEs). Also, device trust manager 24 may be configured for delivery of signed software updates (e.g., Over the Air (OTA) updates), may be integrated with the IoT Trust Manager 44 for Certificate Lifecycle Management (CLM), may provide zero touch provisioning to IoT platforms, may include device security event monitoring with Security Information and Event Management (SIEM) integrations, etc. Furthermore, the device trust manager 24 may support TrustEdge agents (e.g., powered by TrustCore), provide support for Linux, Windows, Real-Time Operating Systems (RTOSs), and may be built on any suitable cyber security and/or certification system (e.g., trust entity 14, SaaS system, etc.) with on-premises offerings.

Distributed System

Figure 3:
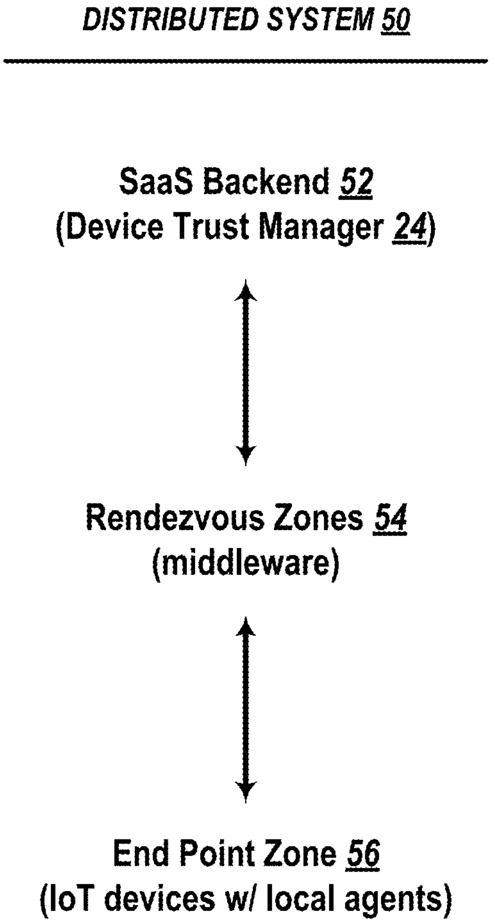
FIG. 3 is a diagram illustrating a three-layer distributed system for conducting security and authentication services, according to various embodiments.

FIG. 3 is a diagram illustrating an embodiment of a distributed system 50 for conducting security and authentication services and may include many similarities to the three-layer trust system 10 of FIG. 1. As shown, the distributed system 50 may include a SaaS backend 52, which may include, for example, the device trust manager 24 shown in FIGS. 1 and 2. The distributed system 50 may also include one or more Rendezvous Zones (RZ) 54, which may include middleware for enabling distributed functionality for providing cyber security, certification, identity, and other related services for a plurality of end user devices and/or IoT devices. In some embodiments, the RZ 54 may include a fog layer and an edge layer, whereby the fog layer is arranged between the SaaS backend 52 layer and the edge layer. In this respect, both the fog layer and edge layer may include middleware and/or proxy functionality for operating on behalf of multiple IoT devices (e.g., millions of IoT devices) with respect to the single, centralized SaaS backend 52 providing device trust services. At the bottom of the distributed system 50 is an end point zone 56, which is where the IoT device (e.g., IoT units 36) may be arranged. In particular, each of the IoT devices in the end point zone 56 may include a local agent configured to operate with the middleware within the corresponding intermediate proxy components (e.g., RZ proxy devices 34) in the RZ 54.

Pillars of the Device Trust System

Figure 4:
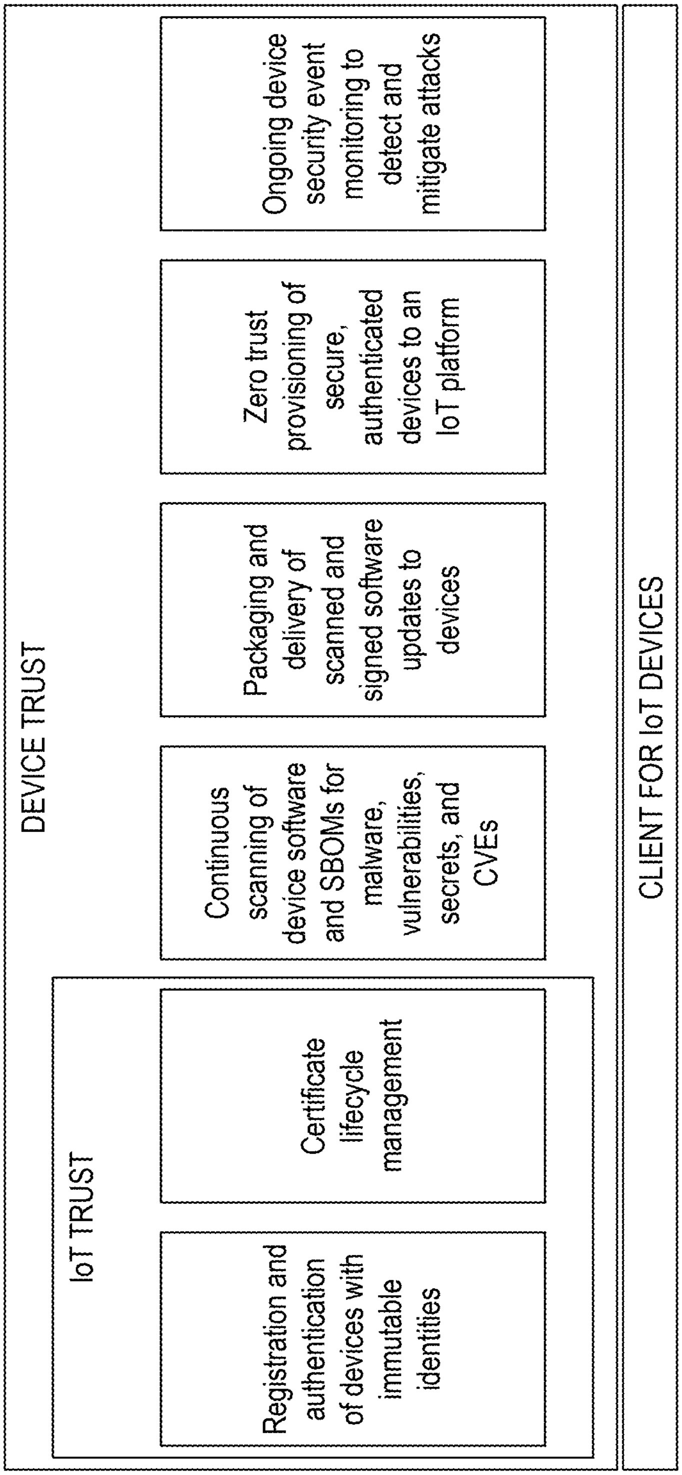
FIG. 4 is a diagram illustrating pillars of a device trust system, according to various embodiments.

FIG. 4 is a diagram showing an example of six pillars of a device trust system, such as the trust entity 14, SaaS backend 52, etc. In some embodiments, the first two pillars may include registration/authentication and CLM, which may be included normally in an IoT trust management component (e.g., IoT trust manager 44) and now incorporated as part of a device trust component (e.g., device trust manager 24). The device trust system may include device software and Software Bill of Material (SBOM) scanning, signed software updates, zero touch provisioning, and security event monitoring included in the next four pillars. The six pillars of the device trust manager may operate with a local agent embedded on the IoT devices, which may be referred to as a trust edge at lowest layer of the end point zone 56.

According to some embodiments, Pillar #1 may include Registration and Authentication of devices with immutable identities based on a hardware RoT. Registration may be done for single devices or bulk devices and may include Just In Time (JIT) inventory processing during manufacturing. Authentication may include a "birth" (e.g., manufacturing) credential and may include a unique x.509 certificate, a shared x.509 with other similar products, symmetric key, passcode, etc. Roots of Trust (RoT) may include TPM 1.2, 2.0, PKCS #11 secure elements, etc.

Also, Pillar #2 may include Certificate Lifecycle Management (CLM) for birth and operational certificates. Digital certificates (e.g., birth certificates) may include single certificate issuance, bulk certificate issuance, CSA Matter DAC, device keys protected by secure elements, server-side key generation, etc. Operational Certificates may include x.509 certificates, CSA Matter NOC, an ability to exchange birth credential for an operational x.509 certificate, etc.

Pillar #3 may include Device Updates, such as for packaging and delivery of scanned and signed software updates to devices. Software updates may include Packaging, Versioning, Targeting updates to groups, Updates over MQTT, etc. Operating Systems may include RTOS, Linux, Windows, etc.

Pillar #4 may include Software and SBOM Scanning, such as continuous scanning of device software and SBOMs for malware, vulnerabilities, secrets, Common Vulnerabilities and Exposures (CVEs), etc. Threat Detection may include scanning all device software components, identifying malware, identifying secrets, identifying vulnerabilities, etc. SBOM may Autogenerate SBOM from ReversingLabs scan, Manually upload of SBOM, CycloneDX SBOM support, etc. Continuous Monitoring may include continuous scanning of SBOM against CVE databases, notifications when new CVEs detected in SBOM, grouping of affected devices, etc. This can also include device attestation (integrity of the device).

Pillar #5 may include Zero touch provisioning of secure, authenticated devices to an IoT platform. The IoT Platform Onboarding may include automated device onboarding (provisioning), automated device offboarding (de-provisioning), etc. Dynamic Endpoint Assignment may include MQTT endpoint assignment, policy-based assignment, etc. IoT Platform Connectors may include AWS IoT Core, Azure IoT DPS, Azure IoT Hub, Azure Event Grid MQTT, BYO/Custom, etc.

Pillar #6 may include Security event monitoring, such as ongoing device security event monitoring to detect and mitigate attacks. Device-side policies may include delivering security monitoring policies to devices, monitoring for failed logins, device tampering, etc. Alerting may include customizable alerts (e.g., alerts after X failed login attempts), forward security events to a Security Information and Event Manager (SIEM), etc. SIEM Connectors, for example, may include Splunk, etc.

Distributed Architecture

Figure 5:
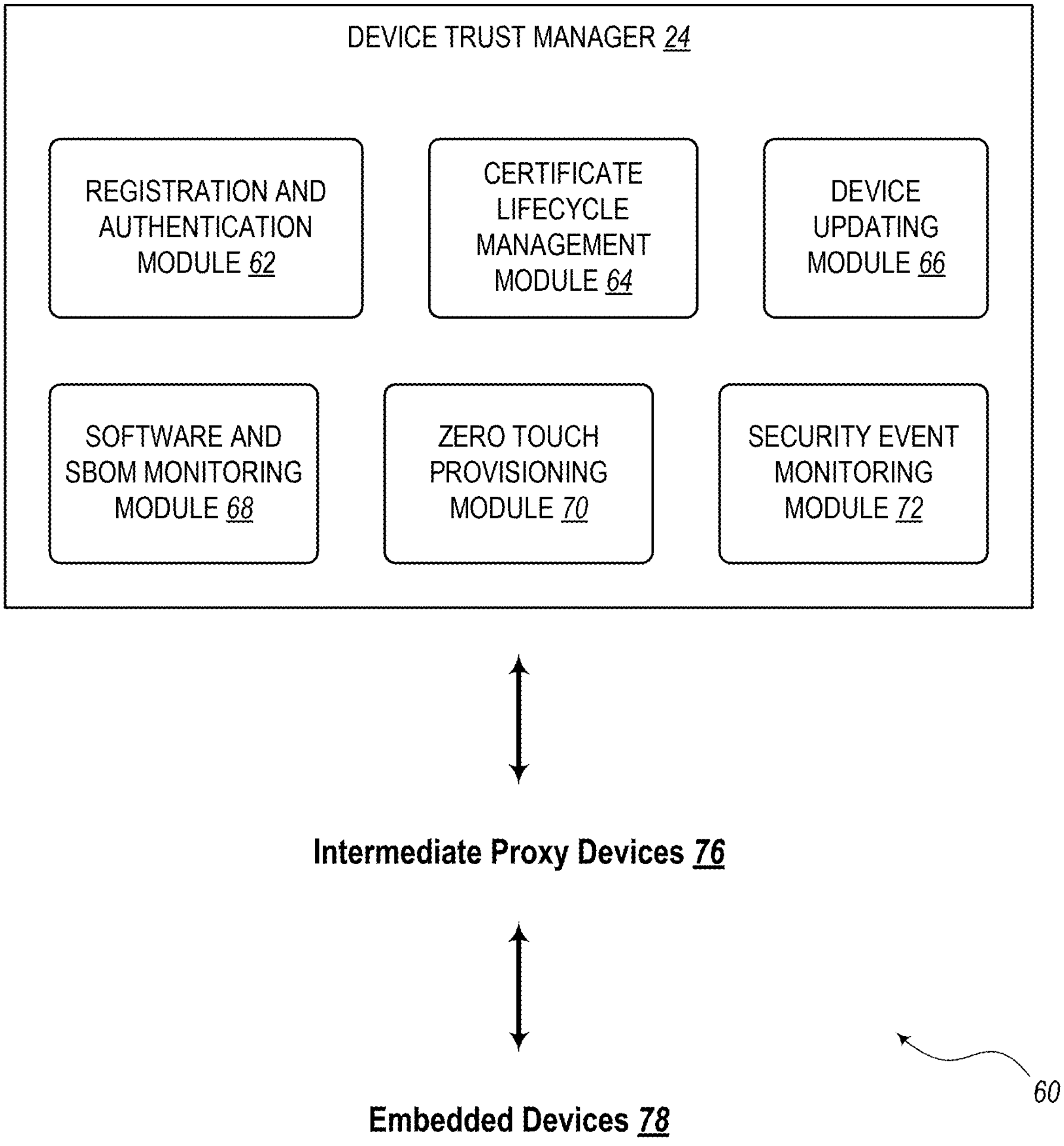
FIG. 5 is a diagram illustrating a three-layer distributed infrastructure including details of the device trust manager shown in FIGS. 1 and 2, according to various embodiments.

FIG. 5 is a diagram illustrating another embodiment of a three-layer distributed infrastructure 60. The top layer includes the device trust manager 24, which may include a registration and authentication module 62, a Certificate Lifecycle Management (CLM) module 64, a device updating module 66, a software and SBOM monitoring module 68, a zero touch provisioning module 70, and a security event monitoring module 72. A middle layer includes intermediate proxy device 76. In some cases, the middle layer may include multiple middle layers interposed between the top layer (i.e., device trust manager 24) and a bottom layer that includes the embedded devices 78 (e.g., IoT units 36, IoT devices, connected devices, resource-constrained devices, etc.).

Proxy/Agent

Figure 6:
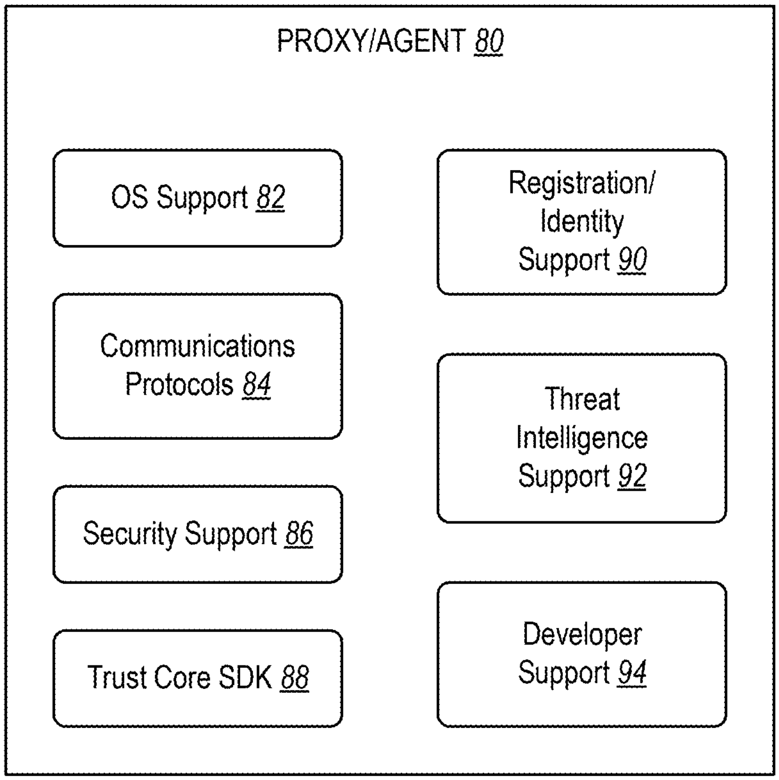
FIG. 6 is a block diagram illustrating a proxy/agent representing one or more of the components of the three-layer trust systems, according to various embodiments.

FIG. 6 is a block diagram illustrating an embodiment of a proxy/agent 80 which may be implemented in the middleware of the intermediate proxy devices 76 and/or in the local agent of the embedded devices 78. In some cases, portions of the proxy/agent 80 may be arranged and/or coded in the proxy devices while other portions may be arranged or coded in the embedded devices. According to some embodiments, certain portions may be implemented in both the proxy devices and embedded devices. One goal, however, may be to move the processing and/or computing functionality normally embedded within the IoT devices or embedded devices to the intermediate proxies to allow the proxies to act on behalf of one or more IoT devices. This allows a simpler or less complex implementation for each of the millions of IoT devices and also allows for better coordination of firmware updates, security policies, etc. As shown, the proxy/agent 80 includes OS support 82, communications protocols 84, security support 86, trust core SDK 88, registration/identity support 90, threat intelligence support 92, and developer support 94.

Computing System

Figure 7:
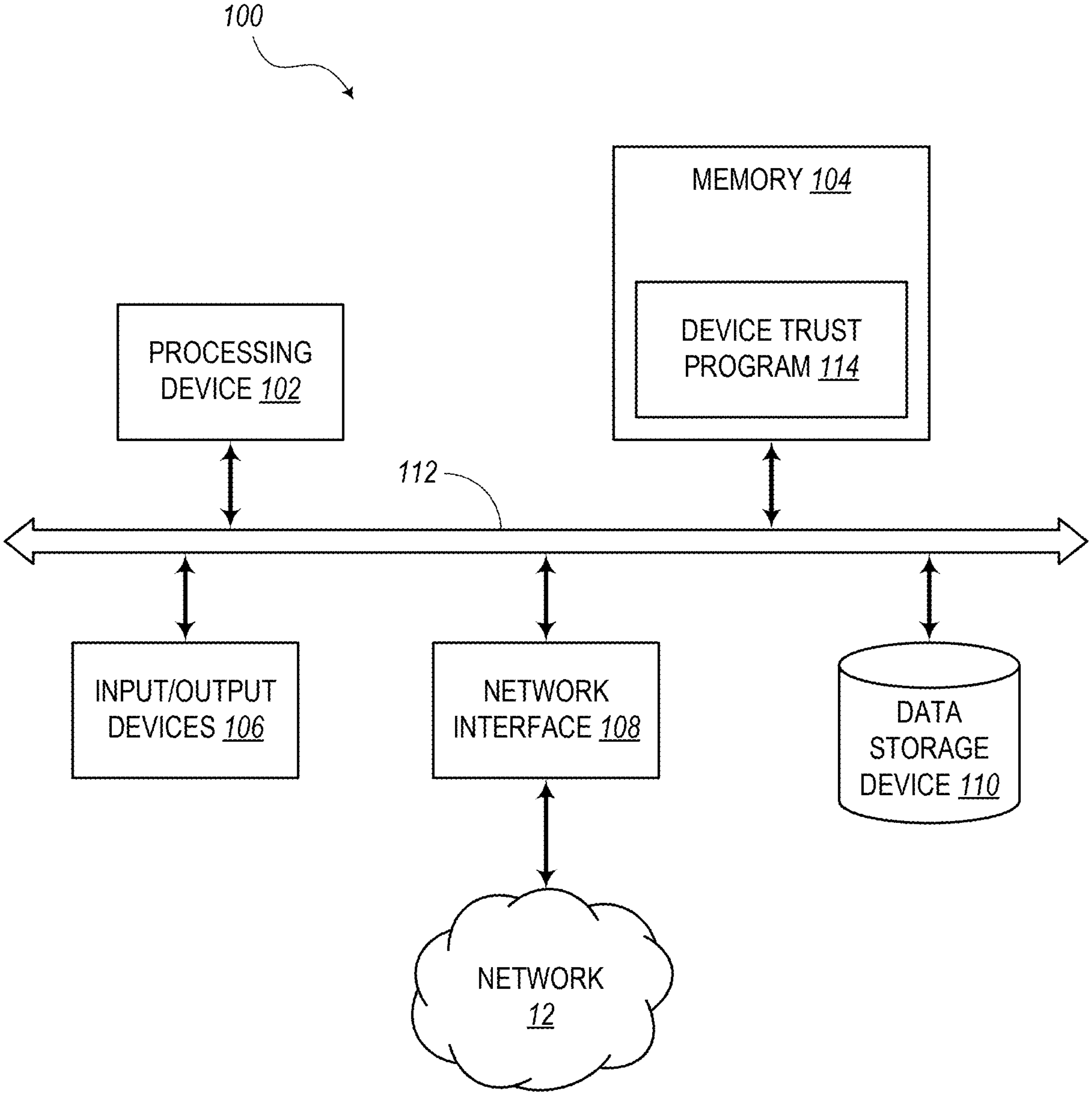
FIG. 7 is a block diagram illustrating a computing system representing the digital trust system, proxy devices, and/or Internet of Things (IoT) devices shown in the previous figures, according to various embodiments.

FIG. 7 is a block diagram illustrating an embodiment of a computing system 100, which may represent the digital trust system 16, device trust manager 24, RZ proxy devices 34, local agents embedded in the IoT units 36, the IoT units 36 themselves, proxy/agent 80, and/or other system or device included in a distributed system in which security, firmware updates, etc. are managed for a plurality of IoT devices. The computing system 100 may be a digital computer that, in terms of hardware architecture, generally includes a processing device 102, a memory 104, input/output (I/O) devices 106, a network interface 108, and a data storage device 110. It should be appreciated by those of ordinary skill in the art that FIG. 7 depicts the computing system 100 in an oversimplified manner, and a practical embodiment may include additional components and suitably configured processing logic to support known or conventional operating features that are not described in detail herein. The components (102, 104, 106, 108, 110) are communicatively coupled via a local interface 112. The local interface 112 may be, for example, but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processing device 102 is a hardware device for executing software instructions. The processing device 102 may be any custom made or commercially available processor, a Central Processing Unit (CPU), an auxiliary processor among several processors associated with the computing system 100, a semiconductor-based microprocessor (in the form of a microchip or chipset), or generally any device for executing software instructions. When the computing system 100 is in operation, the processing device 102 is configured to execute software stored within the memory 104, to communicate data to and from the memory 104, and to generally control operations of the computing system _ pursuant to the software instructions. The I/O devices 106 may be used to receive user input from and/or for providing system output to one or more devices or components.

The network interface 108 may be used to enable the computing system 100 to communicate on a network, such as the Internet. The network interface 108 may include, for example, an Ethernet card or adapter or a Wireless Local Area Network (WLAN) card or adapter. The network interface 108 may include address, control, and/or data connections to enable appropriate communications on the network. A data storage device 110 (e.g., one or more databases, data stores, etc.) may be used to store data. The data storage device 110 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data storage device 110 may incorporate electronic, magnetic, optical, and/or other types of storage media. In one example, the data storage device 110 may be located internal to the computing system 100, such as, for example, an internal hard drive connected to the local interface 112 in the computing system 100. Additionally, in another embodiment, the data storage device 110 may be located external to the computing system 100 such as, for example, an external hard drive connected to the I/O devices 106 (e.g., SCSI or USB connection). In a further embodiment, the data storage device 110 may be connected to the computing system 100 through a network, such as, for example, a network-attached file server.

The memory 104 may include volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 104 may incorporate electronic, magnetic, optical, and/or other types of storage media. Note that the memory 104 may have a distributed architecture, where various components are situated remotely from one another but can be accessed by the processing device 102. The software in memory 104 may include one or more software programs, each of which includes an ordered listing of executable instructions for implementing logical functions. The software in the memory 104 includes a suitable Operating System (O/S) and one or more programs. The O/S essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The computing system 100 further includes a device trust program 114 that may be implemented in any suitable combination of hardware (e.g., configured in the processing device 102) and/or software/firmware (e.g., configured in the memory 104). The device trust program 114 may be stored in any suitable non-transitory computer-readable media (e.g., the memory 104) and may include computer logic or code having instructions that enable or cause the processing device 102 to perform certain actions as discussed in the present disclosure. It may be noted that the device trust program 114 may include different functionality, depending on the layer on which it is deployed. Therefore, the top layer backend system may be configured as a centralized system for managing millions of IoT devices via intermediate RZ devices. Also, the functionality of the device trust program 114, when implemented on the RZ, edge layer, fog layer, etc., may enable a representation or working on behalf of a number of nearby IoT devices and communicating with both the corresponding cluster of IoT devices for which each one is representing and further communicating with the centralized system. Furthermore, the device trust program 114, when implemented on the lowest layer (i.e., as an agent embedded in each IoT device), is configured to discover nearby proxy devices and connect with one or more, as needed, to allow the proxy devices to operate on its behalf for various purposes, such as monitoring the status of the IoT device, receive telemetry information, download new firmware updates, etc.

Of note, the general architecture of the computing system 100 can define any device described herein. However, the computing system 100 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

Therefore, according to various embodiments, the present disclosure may be directed to a distributed system including multiple Internet of Things (IoT) devices distributed throughout a network, where each IoT device is embedded with a local agent configured to perform processing and/or computing functionality. The distributed system may also include a backend entity configured to manage the multiple IoT devices. Furthermore, the distributed system may include multiple Rendezvous Zone (RZ) proxy devices communicatively interposed at edge locations in the network between the backend entity and the multiple IoT devices, wherein each RZ proxy device may be configured to perform trust and security functionality on behalf of one or more IoT devices of the multiple IoT devices.

In some embodiments, the multiple IoT devices may include millions of IoT devices distributed across the globe, wherein the backend entity may be configured as a Certificate Authority (CA) and/or Software as a Service (SaaS) system for securely managing the millions of IoT devices. The distributed system may further include a cluster control device arranged on an RZ layer with the multiple RZ proxy devices for controlling how the IoT devices are clustered with respect to corresponding RZ proxy devices.

The present disclosure is also directed to a device trust manager according to some embodiments. For example, the device trust manager may be configured at a backend of a trust system having at least three deployment layers. The device trust manager may include a processing device and memory that is configured to store a device trust program having computing logic. The computing logic, for example, may be configured to enable or program the processing device to perform a step of managing multiple Internet of Things (IoT) devices distributed at a low layer of the trust system, wherein each IoT device may have a local agent embedded therein. The computing logic may also enable the processing device to communicate with multiple Rendezvous Zone (RZ) proxy devices interposed at edge locations between the device trust manager and the multiple IoT devices. Also, the computing logic may enable the processing device to conduct trust and security functions for the multiple IoT devices via the multiple RZ proxy devices and local agents, each RZ proxy device operating on behalf of one or more IoT devices of the multiple IoT devices.

The device trust manager may be part of a Certificate Authority (CA) configured to securely identify and manage the IoT devices. The computing logic may further enable the processing device to collect analytics obtained throughout the trust system and provide threat intelligence for the multiple IoT devices. The computing logic may also further enable the processing device to record information regarding software or firmware versions and updates with respect to the multiple IoT devices and to download firmware updates as needed to the multiple IoT devices via the RZ proxy devices.

The device trust program stored on the device trust manager, for example, may include a) a registration and authentication module, b) a certificate lifecycle management module, c) a device updating module, d) a software and Software Bill of Materials (SBOM) monitoring module, e) a zero-touch provisioning module, and/or f) a security event monitoring module. In some embodiments, the device trust manager may be configured as a cloud-based Software as a Service (SaaS) system. Also, the device trust manager may further include a set of microservices for multiple clients, wherein the device trust manager may be scalable with an addition of more RZ proxy devices in the trust system.

An intermediate proxy device, according to some embodiments, may be arranged along with one or more other intermediate proxy devices at a Rendezvous Zone (RZ) of a trust system having at least three deployment layers. For example, the intermediate proxy device may also include a processing device and memory, where the memory may be configured to store a device trust program having computing logic that enables the processing device to perform a step of communicating with a device trust manager that is configured as a backend system and is arranged at a top layer of the trust system. The device trust manager, for example, may be configured to manage multiple Internet of Things (IoT) devices distributed at a bottom layer of the trust system. The computing logic may further enable the processing device to conduct trust and security functions for a corresponding cluster of IoT devices of the multiple IoT devices via local agents embedded in the cluster of IoT devices to thereby operate on behalf of the cluster of IoT devices.

In some embodiments, the multiple IoT devices may be resource-constrained devices, embedded devices, or connected devices, wherein the local agent embedded in each respective IoT device may be enacted via an operating system of the IoT device. The computing logic may further enable the processing device to download a digital certificate from the device trust manager onto the cluster of IoT devices, wherein the digital certificate on each IoT device may be configured to identify and/or certify the respective IoT device. In some embodiments, the computing logic may further enable the processing device to perform firmware updates for the cluster of IoT devices.

Furthermore, the intermediate proxy device may further include middleware to enable the intermediate proxy device to act as an edge device for the cluster of IoT devices and to act as a throttle control for the device trust manager for scheduling communications between the multiple IoT devices and the device trust manager. In some embodiments, communication with the cluster of IoT devices may be asynchronous and may include intermittent connectivity. The communication with the cluster of IoT devices may be conducted using a connectivity protocol including one or more of Message Queuing Telemetry Transport (MQTT), Constrained Application Protocol (CoAP), Supervisory Control And Data Acquisition (SCADA), Advanced Message Queuing Protocol (AMQP), a pub/sub protocol, Bluetooth, and a lightweight customized protocol.

The intermediate proxy device, according to some embodiments, may work together with the one or more other intermediate proxy devices at the RZ to dynamically discover and connect clusters of IoT devices to corresponding intermediate proxy devices to evenly distribute loads among the intermediate proxy devices for load balancing and/or bypass intermediate proxy devices that are faulty or overloaded. The clusters of IoT devices may be located in different geographical areas and may be dynamically connected based on geographical proximity, availability, and operability, whereby a detection of faults and/or overloading conditions may be followed by an action of dynamically reassigning the clusters. The intermediate proxy device and the one or more other intermediate proxy devices may be controlled by a cluster control device to assign the clusters of IoT devices with corresponding intermediate proxy devices, wherein the cluster control device may be configured to synchronize data between the intermediate proxy devices using Intermediate System to Intermediate System (IS-IS) functionality.

The intermediate proxy device may be dedicated to a specific enterprise within an isolated cloud or customer cloud, wherein the cluster of IoT devices may also be located on the premises of the enterprise and may include connectivity with the intermediate proxy device using an on-premises bridge. The intermediate proxy device may be configured as one of a network switch, network router, Wi-Fi router, modem, Bluetooth router, edge node, and fog node. The trust system may include at least four deployment layers including a fog layer between the RZ and the top layer, wherein the fog layer may also include processing and/or computing functionality within the trust system. The computing logic may further enable the processing device to provide processing and/or computing functionality on behalf of each IoT device of the cluster of IoT devices when the processing and/or computing functionality is essentially transferred or offloaded from the cluster of IoT devices to the intermediate proxy device.

The computing logic may further enable the processing device to provide a) Operating System (OS) support, b) communication protocol support, c) security or PKI support, d) trust core SDK support, e) registration/identity support, f) threat intelligence support, and/or g) developer support, for the cluster of IoT devices. In some embodiments, each IoT device may be a refrigerator, freezer, oven, stove, kitchen range, microwave oven, dishwasher, coffee maker, espresso machine, toaster, toaster oven, air fryer, blender, mixer, food processor, juicer, slow cooker, pressure cooker, ice maker, washer, dryer, vacuum cleaner, barista machine, HVAC system, utility meter, smart door lock, security system, smoke detector, carbon monoxide detector, measuring and testing device, heartrate monitor, glucose monitor, temperature sensor, smart watch, smart ring, network equipment, network switch, router, modem, Wi-Fi access point, vending machine, sensor, camera, autonomous vehicle, medical equipment, personal medical device, medication administering device, or other electronic or manufactured device.

ADDITIONAL CONSIDERATIONS

The agents embedded in the IoT unit 36 or IoT devices may be TrustEdge agents. The Device Trust Manager 24 may represent a device client for RTOS, Linux, Windows, etc., and in some embodiments may be powered by TrustCore.

The systems of the present disclosure may provide support for RTOS, Linux, Windows, MQTT (e.g., MQTT 3.1.1/5.0 client), SCEP client, etc. Other powerful capabilities may include TLS/SSL, DTLS, OpenSSL connector, Crypto import/export, Secure elements, FIPS 140-2/3 Level 1, etc. Also, the systems may be developer-friendly and include abstraction layers, may be simple to use, have great documentation, and provide premium support.

Also, the systems and methods of the present disclosure may be FDA compliance. The embodiments herein may include cybersecurity and compliance with respect to Medical Devices: Quality System Considerations and Content of Premarket Submissions (September 2023), etc.

TrustCore SDK, for example, may include cryptographic protection (e.g., confidentiality, integrity, authenticity, etc.) for all data types and uses, including firmware and code signing, plus PQC support (e.g., Dilithium). They may include simply-to-use APIs for interfacing with secure elements and crypto libraries, including OpenSSL connector. The protocols may include TLS 1.3, DTLS 1.3, MQTT over TLS, SCEP, FIPS 140-2 level 1 certified (with FIPS 140-3 in progress), etc.

A Software Trust Manager of the software trust portfolio 20 may include Threat Detection features to enhance the security of devices by scanning the device software for vulnerabilities. Vulnerability scanning, for example, may use FOSSA, ReversingLabs, Apple notarization, etc. This may generate SBOMs representing the software components on devices The Device Trust Manager 24 may be configured to import SBOMs from the Software Trust Manager or manually upload them. It may continuously monitor SBOMs for new CVEs. It may also alert when new CVEs are found, even months or years later. Also, it may deploy OTA updates to affected devices using signed updates Therefore, the systems and methods described herein may be configured for managing a large number of connected devices in a disturbed environment. Again, a current problem is that managing a large number (e.g., millions) of devices has always been a challenge for IoT and connected device manufacturers. Security aside, scalability is another issue which often becomes the first consideration for many users who are interested in achieving device management but are facing limitations such as air gapped environments, distributed systems, and other blockers.

The proposed solution of the present disclosure is configured to overcome these issues. The embodiments described herein are configured to take advantage of a three layer approach model with backend, middleware (proxy), and agents on devices. This allows the backend or centralized system to manage millions of devices more efficiently and effectively. The approach described herein enables users to define security at "birth" and continue to evolve with the devices as they progress in their security journey. The novelty of the present approach, among other things, is the scalability and reliability model beyond just utilizing existing platforms or protocols.

In particular, the layered architecture includes 1) Backend—SaaS—(e.g., a cloud), 2) Rendezvous Zone—a middle layer that operates between the devices and the cloud, and 3) Local agents on the devices, wherein the devices are related to IoT technology, Object Oriented Technology (OOT), Supervisory Control And Data Acquisition (SCADA) technology, etc. Therefore, by deploying such a three-layered architecture, manufacturers or vendors of certain devices (e.g., smart fridges, etc.) do not need to build their own platform for managing the devices. Instead, they can implement the systems and methods described herein, which can provide better security, firmware updating, etc. for their IoT devices.

Thus, the Device Trust Manager 24 described herein, within the layered architecture, can provide a) the ability to support a large number of devices (on the order of tens of millions or more), b) the ability to communicate with devices having poor connectivity (e.g., vending machines that are not consistently connected to the Internet), which may include the MQTT protocol, c) the ability to offload processing from the devices to the RZ (e.g., the lowest level IoT devices do not need to have much computing capabilities), thereby allowing the RZ to do things like process certificates, authenticate, provide firmware updates, etc., among other things. It should be noted that the systems described herein are able to improve the traditional IoT management infrastructure by enabling scalability and security to a greater degree than what is possible with conventional systems.

From a remote location, a user (e.g., manufacturer, vendor, etc.) may be able to log into the Device Trust Manager 24, which may be hosted by a SaaS offering. The user may add an identity to a new device, which can happen via the CA back end. They could go ahead and update the device securely over the air. Next, they can go ahead and collect some analytics about these devices, such as 1) how many of them are on, 2) how many of them are off, 3) what firmware they are running, 4) if they are outdated, 5) when they have been updated, etc. Also, trust management may include threat intelligence for these devices.

In some cases, the manufacturer may incorporate software in their devices (e.g., kitchen appliances, medical devices, etc.) along with the hardware that might normally be a part of those devices that they are going to sell. Again, the devices could be vending machines, medical devices, networking equipment, kitchen appliances, or any other type of product that might be monitored in an IoT monitoring environment. One goal is that as long as a manufacturer has capable hardware as well as a supported operating system, the manufacturer can further install the "local agent" with other software in the memory of the device. This local agent, as described throughout the present disclosure, is embedded in the IoT device, and can thereby enable this device to be monitored according to the teachings of the present disclosure. Again, the IoT monitoring systems of the present disclosure are configured on at least three layers. The IoT layer, or end point zone, includes the IoT devices with the embedded agents configured in the operating systems of the IoT devices. In an initial step, the agent may be configured to connect to our backend service to register the device to allow the backend to manage it remotely.

Again, the communication between the centralized backend service system (e.g., SaaS) and the millions of IoT devices include one or more intermediate layers, which may include any suitable communication protocols, connectivity protocols, etc. Networking via the intermediate zone or RZ may include Wi-Fi routers, networking switch, wired routers, Bluetooth communication devices, etc., depending on the various configurations, microcontrollers, environments, amount of memory available, operating systems supported, among other factors. One example may include implementation with respect to Mobile Device Management (MDM) systems. In some embodiments, Internet access (to the backend) may include an intermediate RZ proxy device that is configured to represent one domain, one enterprise, one company, one organization, one university, etc. and may handle and manage up to hundreds or thousands of end point devices for the respective enterprise or whatever.

The embodiments described herein may be applicable to security, which may be added on top of regular IoT management. In this way, hackers will be unable to hack into an individual's end point devices. The embodiments herein may minimize the footprint of the devices and appeal specifically to IoT environments, in which IoT devices, embedded device, and/or connected devices may be managed.

At the lowest level, one concern with IoT devices is the issue of enabling communication when communication is not so reliable. Although a laptop may easily access the Internet via wired or wireless connections using reliable networks, an IoT device, on the other hand, may often use unreliable communication methods. In some cases, an IoT device may use a satellite, or it could be a sensor on the bottom of the ocean, etc. Thus, it may be very difficult to have constant communication with these IoT devices. As such, the MQTT protocol may be chosen, which is a lightweight protocol that could be used for these devices.

The local agent on the IoT devices may be configured as a TrustEdge product that is configured to communicate with an edge in a trustworthy and secure manner. Various connectivity and/or communication methods may be used, such as asynchronous connectivity, any suitable pub/sub protocol, MQTT, etc. The local agents allow the devices to connect to and/or discover the multiple Rendezvous Zones (RZs), which can then maintain the "statefulness" of the devices or provide whatever services that can be offered to the devices. The agent can dynamically discover and connect to the available rendezvous zone element, and then the rendezvous zone element can get back to the main services on the backend or cloud service.

The agent essentially introduces the "smartness" into the IoT devices to create that dynamic connectivity model. Also, in some configurations, one IoT device is not necessarily associated with a single RZ proxy, particularly if the IoT is mobile and/or the RZ proxy devices are reassigned to different geographic areas. In addition, if one RZ device goes down (e.g., goes offline, is faulty, is overloaded, etc.) and can no longer act on behalf of a cluster of IoT devices, then the IoT devices and RZ proxy devices can be reassigned appropriately (e.g., with the help of the cluster control device 38). Thus, the connectivity between the lowest level and the RZ can be dynamic, whereby the clustering can be reconfigured as needed to redistribute and/or share the loads on each RZ proxy device 34, as wells as evenly split the traffic, reduce latency, improve communication performance, and perform other tasks to improve (or optimize) operation. Transport can be through any devices or protocols available, such as IP connectivity, application layer protocol, pub/sub, lightweight protocols (e.g., MQTT, Constrained Application Protocol (CoAP), etc.), and/or others.

In some embodiments, certain IoT devices may be confined to a single enterprise or domain. For example, some customer devices might not be exposed to the Internet directly (e.g., in a factory environment). Instead, these devices (e.g., assembly line machines) may be connected to an isolated cloud or customer cloud within a single domain. In some cases, the IoT devices may be extremely low-powered devices. Of course, it may be beneficial to avoid the leakage of trade secrets and maintain operating conditions with respect to the group of machinery operations within the domain. So, in this case, the enterprise may include an on-premises RZ device, bridge, or link that can connect the devices to other rendezvous zones that may be part of the cloud. On the other hand, some devices may directly access the Internet, such as in a home setting.

X.509 Certificate

A certificate authority is an entity that stores, signs, and issues digital certificates. This allows others (relying parties) to rely upon signatures or on assertions made about the private key that corresponds to the certified public key. A CA acts as a trusted third party—trusted both by the subject (owner) of the certificate and by the party relying upon the certificate. For certificate authorities, existing individual validation processes involve the use of third-party verification services to validate basic individual information such as first name, last name, professional title, etc. However, these processes do not include the option to validate and incorporate an individual's crypto wallet address. As cryptocurrency becomes more prevalent, there is an increasing need for a secure, verified method of associating crypto wallet addresses with individuals.

Again, the present disclosure includes wallet information in an X.509 certificate that is issued from a trusted certificate authority. For example, the wallet information can be included in the Subject Alternative Name (SAN) field of an X.509 certificate. The present disclosure enhances the existing individual validation process by incorporating the option for an individual to supply a crypto wallet address. This address is captured, validated, and stored in a database along with the individual's basic information. An X.509 personal certificate containing all the individual information, as well as the wallet address, is then generated, which can be used to sign digital content.

X.509 certificates are defined by ITU X.509, Information technology-Open Systems Interconnection—The Directory: Public-key and attribute certificate frameworks, October 2019, the contents of which are incorporated by reference in their entirety. An X.509 certificate binds an identity to a public key using a digital signature. A certificate contains an identity (a hostname, or an organization, or an individual) and a public key (e.g., RSA, DSA, ECDSA, ed25519, etc.), and is signed by a certificate authority. X.509 also defines certificate revocation lists, which are a means to distribute information about certificates that have been deemed invalid by a signing authority, as well as a certification path validation algorithm, which allows for certificates to be signed by intermediate CA certificates, which are, in turn, signed by other certificates, eventually reaching a trust anchor. When a certificate is signed by a trusted certificate authority, or validated by other means, someone holding that certificate can use the public key it contains to validate documents or content digitally signed by the corresponding private key.

In an embodiment, an X.509 certificate can be used to digitally sign content. A content signing certificate allows individuals, teams, and organizations to add an electronic, digital signature to a document or other content in a variety of file formats to prove ownership. The digital signature is an encrypted hash of your message that can only be decrypted by someone who has a copy of your public key, which ensures (1) content stays unaltered, (2) the creator's identity is confirmed, and the like.

A digital signature cryptographically binds a digital signature certificate, issued by a trust services provider (TSP), to a document using public key infrastructure (PKI) technology. Digital signatures validate and authenticate signer identity and document integrity, delivering higher levels of assurance that the signer is who they say they are and that the document has not been altered. Digital signatures are ideal for transactions that require higher level of security and are necessary in certain countries and regions where companies are required to comply with legal regulations. In some countries, some forms of digital signatures have legal validity equivalent to handwritten signatures.

In another embodiment, the X.509 certificate can be referred to as a personal certificate, i.e., it does not necessarily need to be used to digitally sign content. In a further embodiment, the X.509 certificate can be a content credential that includes history and identity data attached to content. A user can view this data when a creator or producer has attached it to content to understand more about what has been done to it, where it has been, and who is responsible. Content credentials are public and tamper-evident, and can include info like edits and activity, assets used, identity info, and more.

CONCLUSION

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A distributed system for monitoring multiple Internet of Things (IoT) devices distributed throughout a network, each IoT device embedded with a local agent configured to perform processing and/or computing functionality, the distributed system comprising:

a backend entity configured to manage the multiple IoT devices, each RZ proxy device of the multiple RZ proxy devices serving a respective cluster of IoT devices of the multiple IoT devices; and multiple Rendezvous Zone (RZ) proxy devices communicatively interposed at edge locations in the network between the backend entity and the multiple IoT devices;

wherein each RZ proxy device is configured to perform trust and security functionality with and on behalf of the respective cluster of IoT devices, the trust and security functionality including at least (i) enrollment of a digital certificate issued by the backend entity onto each IoT device of the respective cluster, and (ii) brokered delivery of signed firmware updates from the backend entity to the respective cluster of IoT devices, and wherein each RZ proxy device is further configured to offload processing from the respective cluster of IoT devices to the RZ proxy device via the local agents embedded in the respective cluster of IoT device.

2. The distributed system of claim 1, wherein the multiple IoT devices include IoT devices geographically distributed and wherein the backend entity is configured as a Certificate Authority (CA) and/or Software as a Service (Saas) system for securely managing the millions of IoT devices.

3. The distributed system of claim 1, further comprising a cluster control device arranged on an RZ layer with the multiple RZ proxy devices for controlling how the IoT devices are clustered with respect to corresponding RZ proxy devices.

4. A device trust manager configured at a backend of a trust system having at least three deployment layers, the device trust manager comprising:

a hardware processing device; and non-transitory memory configured to store a device trust program having computing logic that enables the hardware processing device to perform steps of managing multiple Internet of Things (IoT) devices distributed at a low layer of the trust system, each IoT device having a local agent embedded therein, communicating with multiple Rendezvous Zone (RZ) proxy devices deployed at a middle layer of the trust system and interposed at edge locations between the device trust manager and the multiple IoT devices, each RZ proxy device of the multiple RZ proxy devices serving a respective cluster of IoT devices of the multiple IoT devices, and conducting trust and security functions for the multiple IoT devices via the multiple RZ proxy devices and local agents, each RZ proxy device operating on behalf of the respective cluster of IoT devices, wherein the trust and security functions include enrollment of digital certificates issued by the device trust manager onto the IoT devices via the multiple RZ proxy devices and delivery of signed firmware updates from the device trust manager to the IoT devices via the multiple RZ proxy device.

5. The device trust manager of claim 4, wherein the device trust manager is part of a Certificate Authority (CA) configured to securely identify and manage the IoT devices.

6. The device trust manager of claim 4, wherein the computing logic further enables the processing device to collect analytics obtained throughout the trust system and provide threat intelligence for the multiple IoT devices.

7. The device trust manager of claim 4, wherein the computing logic further enables the processing device to record information regarding software or firmware versions and updates with respect to the multiple IoT devices and to download firmware updates as needed to the multiple IoT devices via the RZ proxy devices.

8. The device trust manager of claim 4, wherein the device trust program includes one or more of a) a registration and authentication module, b) a certificate lifecycle management module, c) a device updating module, d) a software and Software Bill of Materials (SBOM) monitoring module, e) a zero touch provisioning module, and f) a security event monitoring module.

9. The device trust manager of claim 4, wherein the device trust manager is configured as a cloud-based Software as a Service (SaaS) system.

10. The device trust manager of claim 4, further comprising a set of microservices for multiple clients, wherein the device trust manager is scalable with an addition of more RZ proxy devices in the trust system.

11. An intermediate proxy device arranged along with one or more other intermediate proxy devices at a Rendezvous Zone (RZ) of a trust system having at least three deployment layers, the intermediate proxy device comprising:

a hardware processing device; and non-transitory memory configured to store a device trust program having computing logic that enables the hardware processing device to perform steps of communicating with a device trust manager configured as a backend system and arranged at a top layer of the trust system, wherein the device trust manager is configured to manage multiple Internet of Things (IoT) devices distributed at a bottom layer of the trust system, and conducting trust and security functions for a corresponding cluster of IoT devices of the multiple IoT devices via local agents embedded in the cluster of IoT devices to thereby operate on behalf of the cluster of IoT devices, the trust and security functions including (i) downloading a digital certificate issued by the device trust manager onto each IoT device of the cluster of IoT devices, (ii) brokering signed firmware updates from the device trust manager to the cluster of IoT devices, and (iii) offloading cryptographic processing from the cluster of IoT devices to the intermediate proxy device via the local agents.

12. The intermediate proxy device of claim 11, wherein the multiple IoT devices are resource-constrained devices, embedded devices, or connected devices, and wherein the local agent embedded in each respective IoT device is enacted via an operating system of the IoT device.

13. The intermediate proxy device of claim 11, wherein the computing logic further enables the processing device to download a digital certificate from the device trust manager onto the cluster of IoT devices, the digital certificate on each IoT device configured to identify and/or certify the respective IoT device.

14. The intermediate proxy device of claim 11, wherein the computing logic further enables the processing device to perform firmware updates for the cluster of IoT devices.

15. The intermediate proxy device of claim 11, further comprising middleware to enable the intermediate proxy device to act as an edge device for the cluster of IoT devices and to act as a throttle control for the device trust manager for scheduling communications between the multiple IoT devices and the device trust manager, wherein the throttle control schedules application-layer trust management communications between the cluster of IoT devices and the device trust manager, the trust management communications including at least certificate enrollment messages and firmware update messages, the scheduling configured to limit a rate of the trust management communications presented to the device trust manager from the multiple RZ proxy devices.

16. The intermediate proxy device of claim 11, wherein communication with the cluster of IoT devices is asynchronous and includes intermittent connectivity.

17. The intermediate proxy device of claim 16, wherein communication with the cluster of IoT devices is conducted using a connectivity protocol including one or more of Message Queuing Telemetry Transport (MQTT), Constrained Application Protocol (CoAP), Supervisory Control And Data Acquisition (SCADA), Advanced Message Queuing Protocol (AMQP), a pub/sub protocol, Bluetooth, and a lightweight customized protocol.

18. The intermediate proxy device of claim 11, wherein the intermediate proxy device works together with the one or more other intermediate proxy devices at the RZ to dynamically discover and connect clusters of IoT devices to corresponding intermediate proxy devices to evenly distribute loads among the intermediate proxy devices for load balancing and/or bypass intermediate proxy devices that are faulty or overloaded, wherein the dynamic discovery and connection are coordinated by a cluster control device arranged at the RZ, the cluster control device configured to (i) reassign at least one cluster of IoT devices from a first intermediate proxy device to a second intermediate proxy device responsive to a detection that the first intermediate proxy device is faulty or overloaded, and (ii) synchronize state data between the intermediate proxy devices using Intermediate System to Intermediate System (IS-IS) functionality.

19. The intermediate proxy device of claim 11, wherein the intermediate proxy device is dedicated to a specific enterprise within an isolated cloud or customer cloud, wherein the cluster of IoT devices is located on premises of the enterprise and includes connectivity with the intermediate proxy device using an on-premises bridge.

20. The intermediate proxy device of claim 11, wherein the intermediate proxy device is configured as one of a network switch, network router, Wi-Fi router, modem, Bluetooth router, edge node, and fog node.

* * * * *